_United States Patent Office_

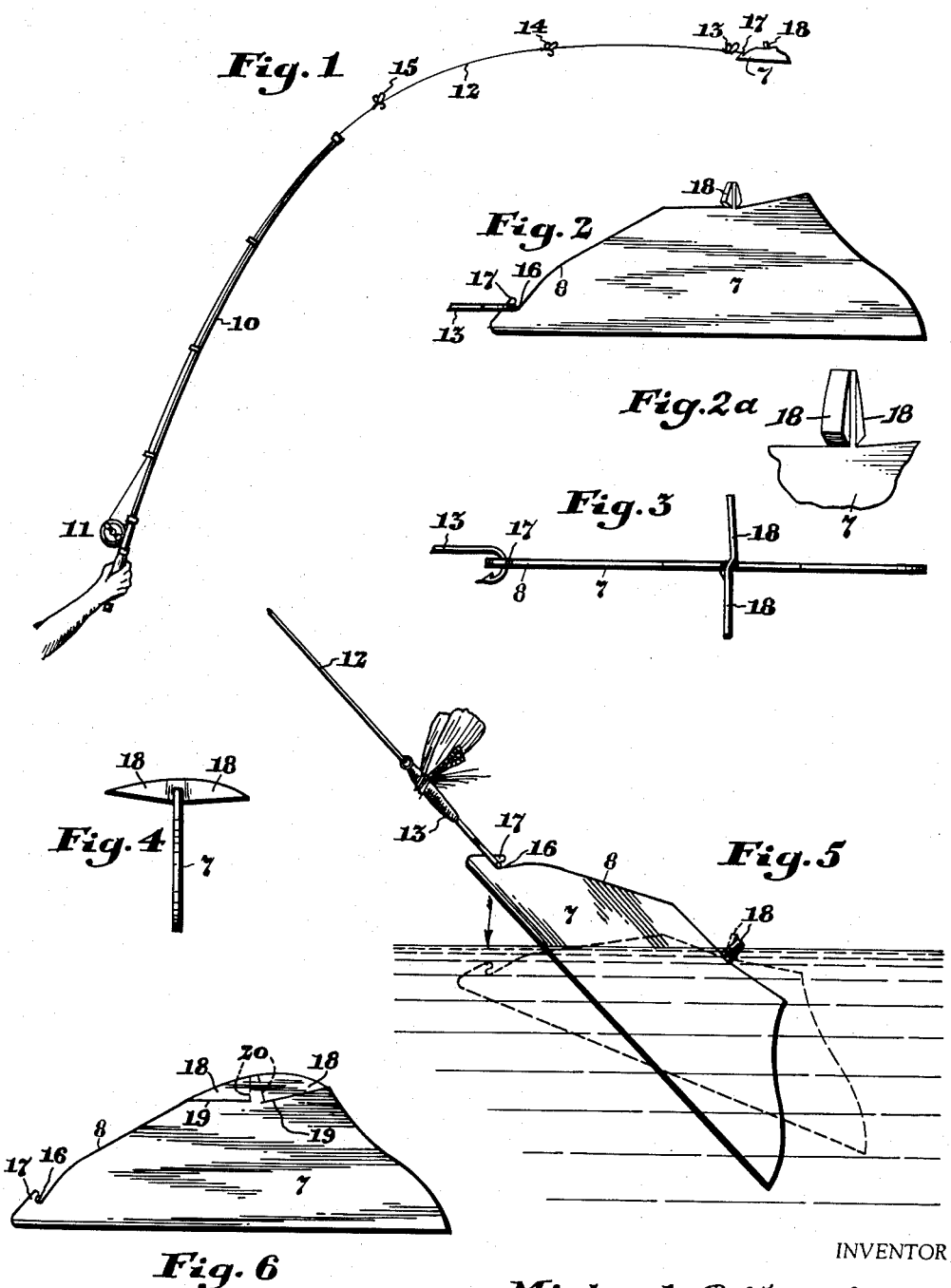

2,741,059
Patented Apr. 10, 1956

2,741,059

FLYCASTING DEVICE

Michael Ostrowski, Grand Rapids, Mich.

Application August 8, 1952, Serial No. 303,219

2 Claims. (Cl. 43—43.12)

The present invention relates to flycasting and the primary object of the invention is to provide a device for lengthening the throw of a flycast, particularly in dry flycasting.

It frequently happens that the best fishing is in waters which lie beyond the reach of the fisherman because of limitations inherent in flycasting, and particularly in dry flycasting. The flies used are light in weight and therefore do not develop the momentum necessary to carry the fishline out as in the case of plug-casting. A good throw in ordinary dry flycasting would be about 40 to 50 feet. The present invention will, under favorable conditions, increase this throw to about 90 feet, thus greatly increasing the fisherman's range and enhancing his chances for success. This is accomplished by providing additional weight at the end of the fishline, the weight being in the form of a device which is lost with the cast but which, being very inexpensive, is expendable for the sake of a good cast.

An illustrative embodiment of the invention is shown in the accompanying drawing, wherein:

Figure 1 depicts a flyrod and tackle in the initial phase of a flycast, and illustrating the device of the invention attached to the end of a fishline;

Figure 2 is an enlarged side elevational view of the device attached to the end of the fishline;

Figure 2a is a greatly enlarged side elevational view of the upper medial fragmentary portion of the device;

Figure 3 is a top plan view of the same;

Figure 4 is a front elevational view of the same;

Figure 5 is a side elevational view of the same entering the water; and

Figure 6 is a view of the sheet metal blank from which the device is made.

Referring now in detail to these drawings wherein like parts are designated by the same numerals in the several views, Figure 1 shows a flyrod 10 with reel 11, fishline 12, an end fly 13 attached to the end of the fishline 12, additional flies 14, 15 attached to the fishline at points spaced from the end of the line, and the new device attached to the end fly 13.

The new device comprises a thin plate of inexpensive metal and of elongated form, the main body of which is generally designated 7. The upper rearward edge 8 of the plate is notched at 16 thus to provide a hook 17 adapted for easily detachable engagement with the hook of the end fly 13. The upper medial edge of the plate has a pair of oppositely laterally extending vanes 18 which are formed by slitting the sheet metal blank shown in Figure 5 as indicated at 19 and bending the vanes outwardly along the dotted lines indicated at 20.

It will be understood that in dry flyfishing it is customary not to apply any sinker or other weight to the end of the line, because it is desirable that the fly float on the surface of the water. Without such auxiliary weight, it is extremely difficult to make a cast of good distance. The present device adds the weight to the end of the line which is essential for a long throw, but when the cast is completed the fly is left to float freely on the surface of the water.

In use, the device is attached to the end of the fishline by engaging its hook 17 with the hook of the end fly 13. Weight is thus added to the end of the line. When the cast is made this weight by its momentum carries the end of the line much farther out than would otherwise be possible. When the device enters the water as illustrated in Figure 5, its forward portion guides the device straight into the water until the vanes 18 engage the surface of the water, whereupon the movement of the upper edge of the device is retarded while the lower portion of the device is permitted to continue its movement. The result is a rotation of the entire device about the vanes 18 as a fulcrum, in the direction indicated by the arrow in Figure 5. This rotation of the device quickly snaps the hook 17 of the device from the hook of the end fly 13, and the device sinks in the water and is lost. However, being extremely inexpensive, this loss of the device is—to the ardent fisherman—nothing as compared to the advantage of the longer cast.

While but one specific embodiment of the invention has been herein shown and described, it will be understood that numerous details may be altered or omitted without departing from the spirit of the invention as the same is defined by the following claims.

I claim:

1. An expendable device for lengthening the throw of a flycast comprising a thin metal plate provided with a hook for engagement of a flyhook on the end of a fishline, said hook being in the upper rearward edge of said plate and being upwardly open, and said plate being provided also with a vertical vane extending laterally from the upper medial edge of the plate and being adapted to engage the surface of the water to retard movement of the upper edge of the device upon its entrance into the water while permitting continued movement of the lower portion of the device through the water, said vane thus serving as a fulcrum about which rotation of the device is effected to disengage its hook from the flyhook.

2. An expendable device for lengthening the throw of a flycast comprising a thin metal plate provided with a hook for the engagement of a flyhook on the end of a fishline, said hook being in the upper rearward edge of said plate and being upwardly open, said plate being provided also with a pair of vertical vanes extending oppositely laterally from the upper medial edge of the plate and being adapted to engage the surface of the water to retard movement of the upper edge of the device upon its entrance into the water while permitting continued movement of the lower portion of the device through the water, said vanes thus serving as a fulcrum about which rotation of the device is effected to disengage its hook from the flyhook.

References Cited in the file of this patent

UNITED STATES PATENTS

| | | |
|---|---|---|
| 1,701,444 | Darr | Feb. 5, 1929 |
| 1,993,114 | Rasmussen | Mar. 5, 1935 |
| 2,085,096 | Hansen | June 29, 1937 |
| 2,460,526 | Oliver et al. | Feb. 1, 1949 |
| 2,566,029 | Louthan | Aug. 28, 1951 |
| 2,608,017 | Hinkson | Aug. 26, 1952 |

FOREIGN PATENTS

| | | |
|---|---|---|
| 846,240 | France | June 5, 1939 |